(12) United States Patent
Chou

(10) Patent No.: US 6,675,918 B2
(45) Date of Patent: Jan. 13, 2004

(54) GARDEN EARTH AUGER

(76) Inventor: Hwei-Rung Chou, 8F., No. 341, Sec. 4, Sinyi Rd., Taipei (TW)

(*) Notice: Subject to any disclaimer, the term of this patent is extended or adjusted under 35 U.S.C. 154(b) by 69 days.

(21) Appl. No.: 10/013,664

(22) Filed: Dec. 13, 2001

(65) Prior Publication Data

US 2002/0175005 A1 Nov. 28, 2002

(30) Foreign Application Priority Data

May 23, 2001 (CN) .................................. 01223497 U

(51) Int. Cl.$^7$ ................................................ E21B 10/44
(52) U.S. Cl. ...................... 175/394; 175/106; 175/121; 175/203
(58) Field of Search .................... 175/394, 84, 104, 175/106, 113, 121, 122, 162, 170, 203

(56) References Cited

U.S. PATENT DOCUMENTS 3,316,983 A * 5/1967 Goodman
4,538,922 A * 9/1985 Johnson
4,817,735 A * 4/1989 Corrigan
6,227,317 B1 * 5/2001 Severns

* cited by examiner

Primary Examiner—Roger Schoeppel
(74) Attorney, Agent, or Firm—Varndell & Varndell, PLLC

(57) ABSTRACT

A garden earth auger operating by repeated twisting its handle is comprised of a drive mechanism at the center of the handle, a gear shaft erected inside the drive mechanism and extending downward to connect to a tooling feeder; a circular yoke inserted onto the gear shaft to control two mobile pawls on one side or both sides of the turning gear shaft to engage or disengage in or from the ratchet for the pawls to drive the ratchet for the tooling feeder to continue circulating for earth excavation in an effort saving fashion while the auger can be easily replaced with a fork or other forms of tooling head to excavate for a pit or scrap soil as desired.

5 Claims, 7 Drawing Sheets

GARDEN EARTH AUGER

BACKGROUND OF THE INVENTION

1. Field of the Invention

The present invention relates to a garden earth auger, and more particularly, to one that is dedicated to excavate for an earth pit or to scrape the soil in an effort-saving fashion by repeated torsion produced by its drive mechanism.

2. Description of the Prior Art

Many garden augers including trowels, hand forks, small cultivators, and dribbles are generally available in the market. Each auger has its own design for use. Within, an auger is made in approximately indicating a T shape provided with a lateral handle at top and a tool head provided at the base for the use to either excavate for a pit or to scrape the soil by twisting the auger.

However, in use, the T-shape auger must have its tool head vertically inserted into the soil to execute repeated 360-degree rotation to maintain digging deeper. Therefore, the user with both hands holding the lateral handle to turn for a certain degree before leaving the handle and to hold the handle once again in order to repeat turning the handle. It makes the excavation rather slow and winding up with a pair of sour hands. The prior art is far from meeting ergonomics.

SUMMARY OF THE INVENTION

The primary purpose is to provide a garden earth auger comprised of a handle, a drive mechanism and a tooling feeder to achieve effort-saving operation. To achieve this purpose, the drive mechanism is provided at the center of the handle; a gear shaft vertically disposed inside the drive mechanism and extending downward to connect to the end of the tooling feeder. The gear shaft is inserted with a circular yoke to control a pair of mobile pawls provided on one side of both sides of the gear shaft for engagement or disengagement in the course of torsion of the gear shaft. The user thus is able to repeat swing the handle to synchronously drive the tooling feeder continuously excavating the earth by the circulating gear shaft as driven by the pawl.

Another purpose of the present invention is to provide a garden earth auger, within, the tooling feeder and the gear shaft allow fast removal, and the base of the tooling feeder can be alternatively adapt to an auger or a fork depending on whether excavation for a pit or soil scrape is desired.

DETAILED DESCRIPTION OF THE PREFERRED EMBODIMENTS

Figure 1:
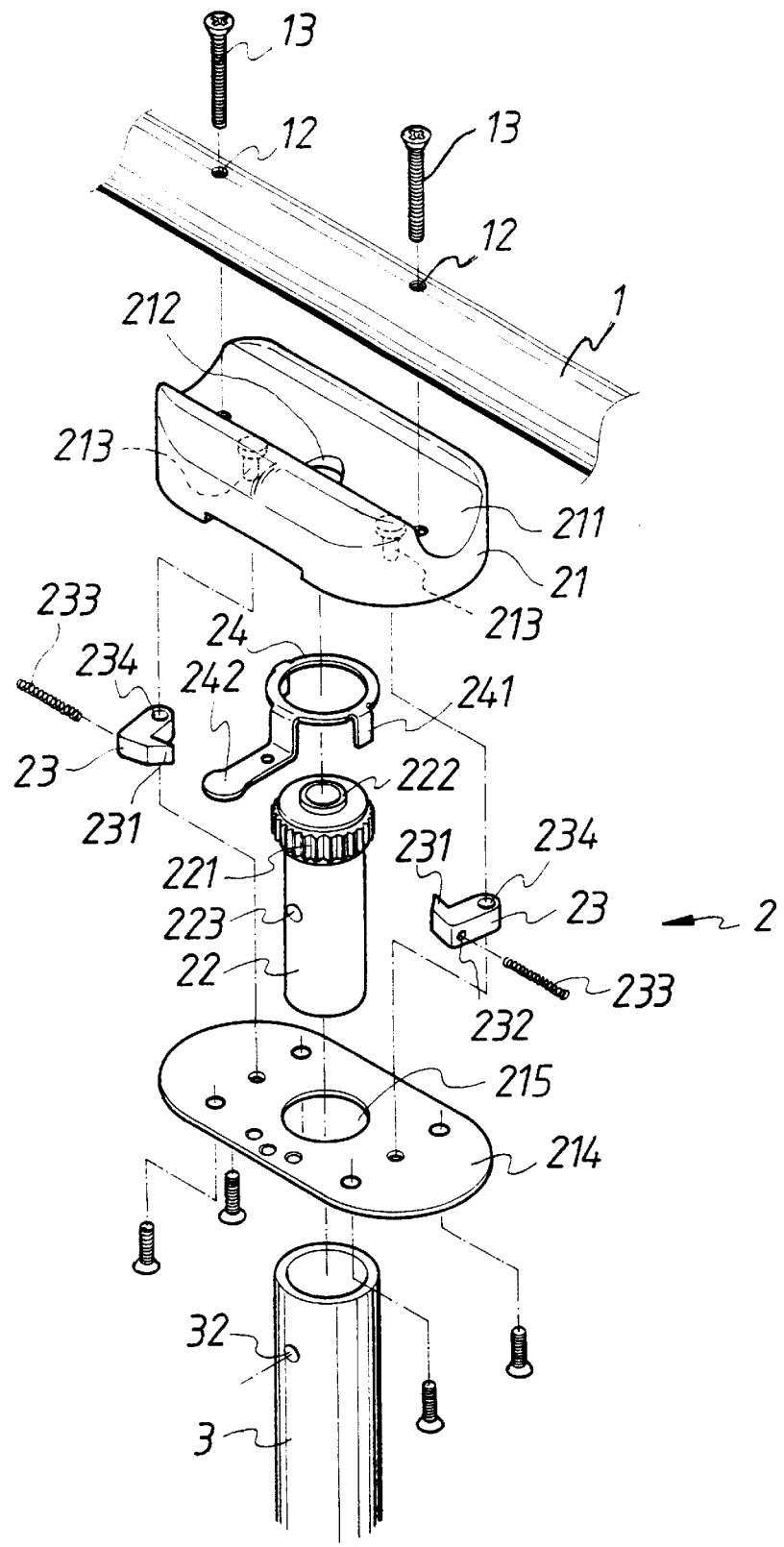
FIG. 1 is an exploded view of the present invention.

Referring to FIG. 1, a garden earth auger of the present invention is essentially comprised of a handle 1, a drive mechanism 2 and a tooling feeder 3. Within, said handle is related to a hollow or solid rod provided with grips 11 respectively provided to both ends and two screw holes 12 drilled through at the central section to receive insertion by two bolts 13.

Figure 2:
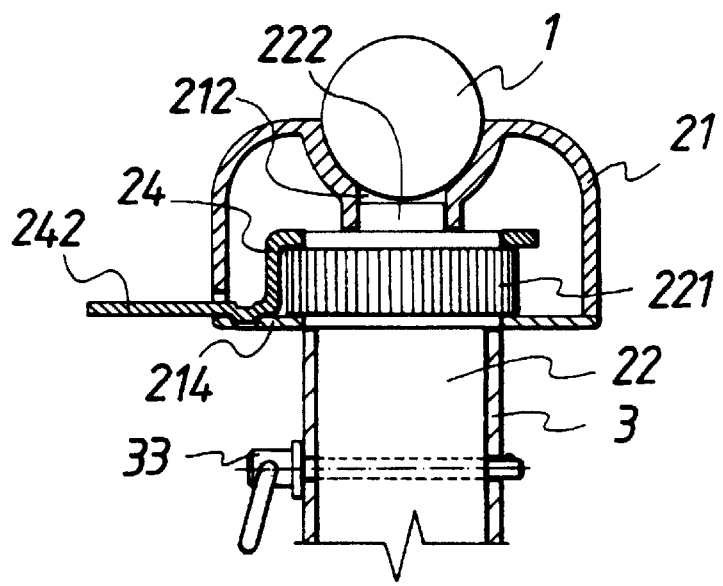
FIG. 2 is a sectional view of an assembly of the present invention.
Figure 3:
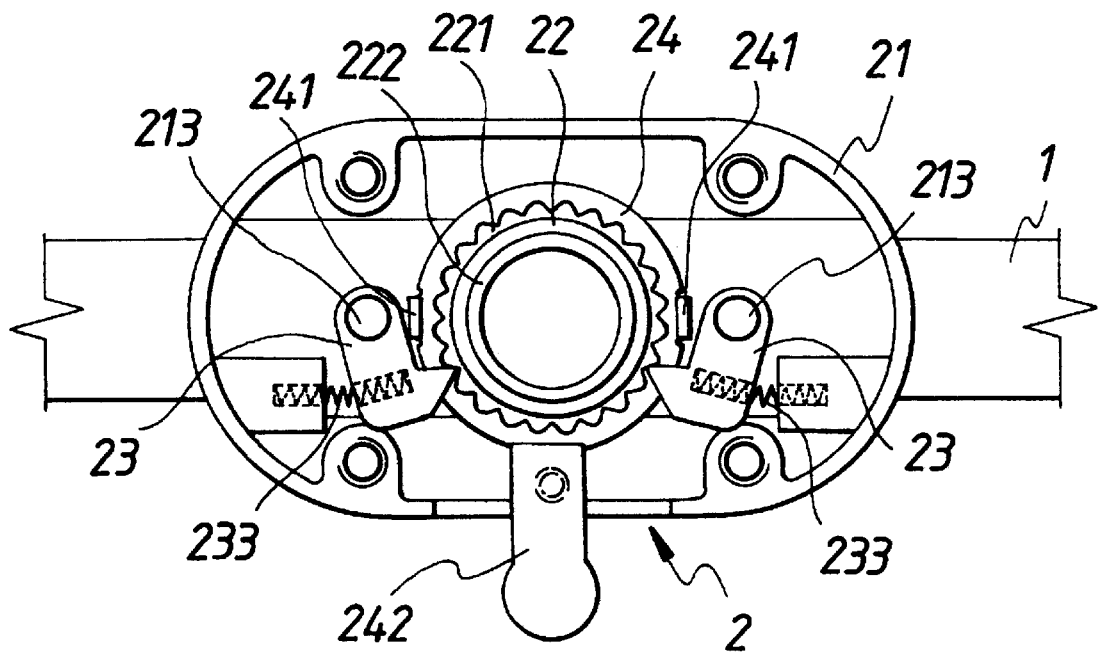
FIG. 3 is a bird's view of the assembly of the present invention.

Said drive mechanism 2 also as illustrated in FIGS. 2 and 3 includes a support 21, a gear shaft 22, a pair of pawls 23 and a yoke 24. Said support 21 includes an inverted U-shaped hollow case, a trough 211 laterally extending at the top, an axial hole 212 bored through the center of the trough 211, pins 213 respectively provided to both sides of the bottom inside of the support 21 and a plate 214 with a central bore 215 being provided at the base of the trough 21 to close up the trough 21.

Said gear shaft 22 relates to a hollow tube, having provided at its top a ratchet 221, a ring 222 protruding from the tip of the ratchet 221, a radial hole 223 being provided on the lower part of the gear shaft 22. The gear shaft 22 is vertically inserted into the support 21 for the support 21 to accommodate the ratchet 221 with the ring 222 to penetrate into the axial hole 212 while the gear shaft 22 extends out of the central bore 215 in the plate 214.

Said pawl 23 indicates a shape of a hooking piece having provided on one side of its front end a tip 231 and on the other side, a circular hole 232 to accommodate insertion of a coil 233, and a pin hole 234 is separately provided at the rear end of the pawl 23. Both pin holes 234 respectively from the pair of pawls 23 are fixed to the support 21 with the pins 213 inside the support while the coil 233 holds against the pawl 23 for its tip 231 to merely to engage in the ratchet 221.

Said yoke 24 relates to a circular ring respectively provided on its both sides a vertically folded bit 241 and a lever 242. The yoke 24 is inserted onto the top of the ratchet 221 with both tags 241 extending along both sides of the ratchet 221 and the lever 242 extending out of the support 21 to turn said tags 241 for controlling the pawls 23 to engage in or disengage from the ratchet 221.

Said tooling feeder 3 has its lower end to be adapted with a hollow tube of a tooling head 31, and the side wall of its upper end provided with a radial hole 32 to receive insertion of a fast pin 33.

Figure 4:
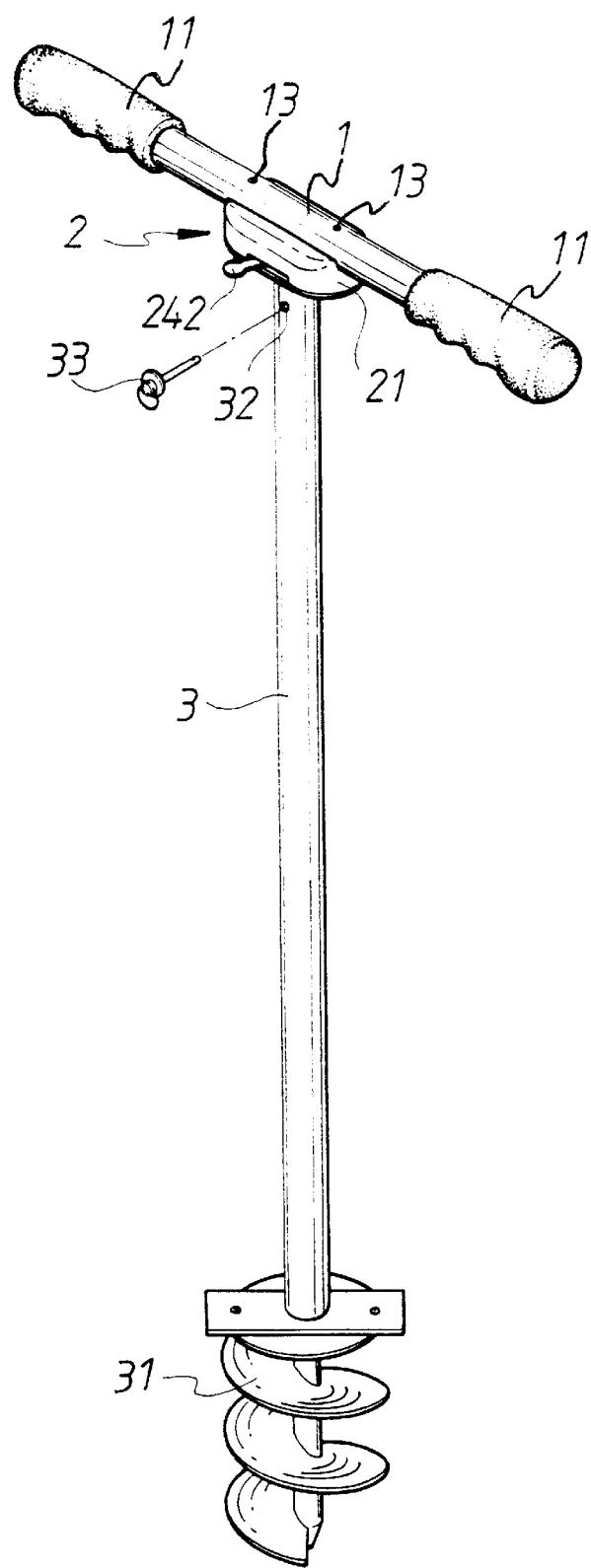
FIG. 4 is a perspective view showing a local assembly of the present invention.

Now referring to FIGS. 1, 2 and 3, the assembly of the drive mechanism 2 is inserted with its trough 211 of the support 21 to where below the central section of the handle 1, and secured in position with the bolts 13 to fix the drive mechanism 2 to the handle 1. The tooling feeder 3 has its top inserted to the gear shaft 22 at where below the drive mechanism 2 and the fast pin 33 is inserted trough the holes 223 and 32 to complete the assembly of a T shaped garden earth auger as illustrated in FIG. 4 for pit excavation for or soil scrape.

Figure 5:
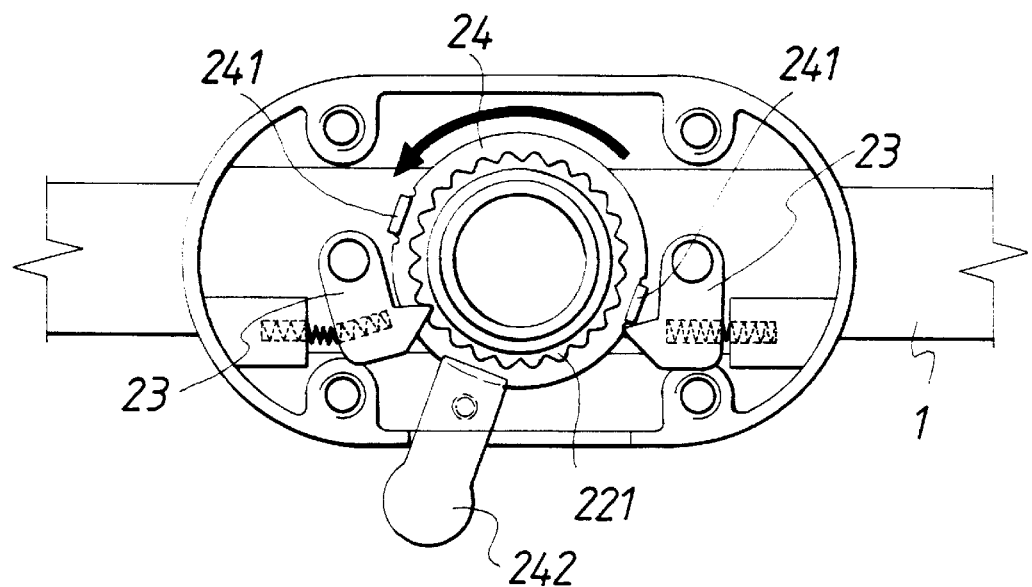
FIG. 5 is a schematic view showing one-way RH operation control of the present invention.
Figure 6:
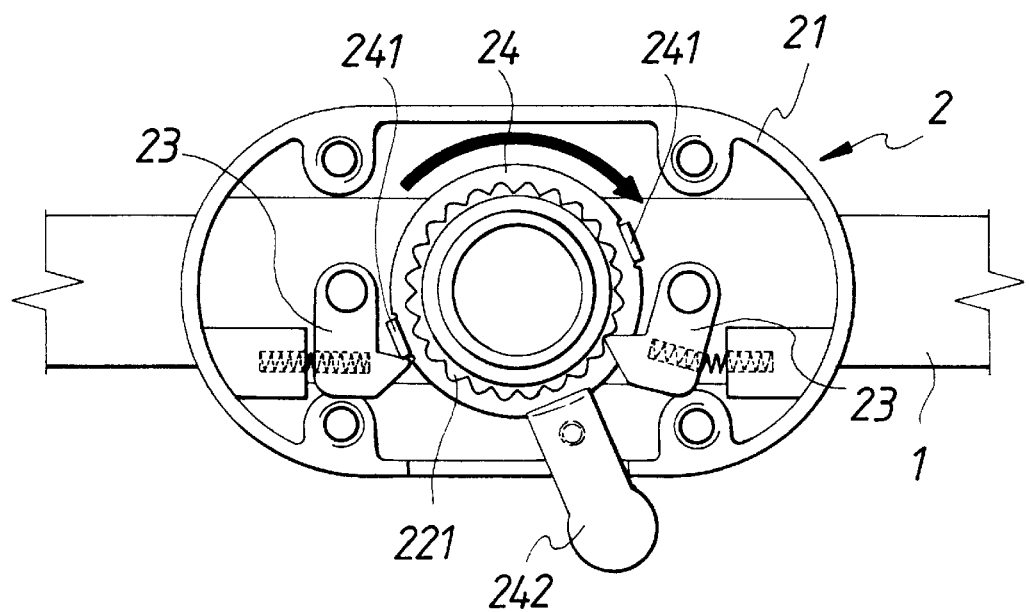
FIG. 6 is a schematic view showing one-way LH operation control of the present invention.

In practice as illustrated in FIGS. 5 and 6, the user pushes the yoke 24 of the drive mechanism for RH circulation so that the RH pawl 23 is disengaged by the tag 241 while the LF pawl is engaged in the gear shaft 22 to push and control the gear shaft 22 to execute one-way circulation. As a result, once the user is holding with both hands onto the handle 1 to repeat swinging, he is able to have one-way control the ratchet 23 to push both of the gear shaft 22 and the tooling feeder 3 to turn in maintaining excavation in an effort-saving fashion. Upon pulling out the garden earth auger, the yoke 24 is turned to the left, the user is at the same time pulling out the tooling feeder 3 by repeating the swinging motion. Therefore, the present invention meets ergonomics since the user is able to directly excavate or scrape the soil simply by swinging the handle 1 without having to spare his hands to exchange holding onto the handle 1.

Furthermore, if the one-way swinging use of the earth auger is not required, the yoke 24 is turned to its neutral position to prevent both tags from holding against respective pawls 23 so that both pawls 23 are engaged in the ratchet 221 and are prevented from turning. In this case, the earth auger of the present invention can be used as a conventional garden tool depending on individual preference of the user.

Figure 7:
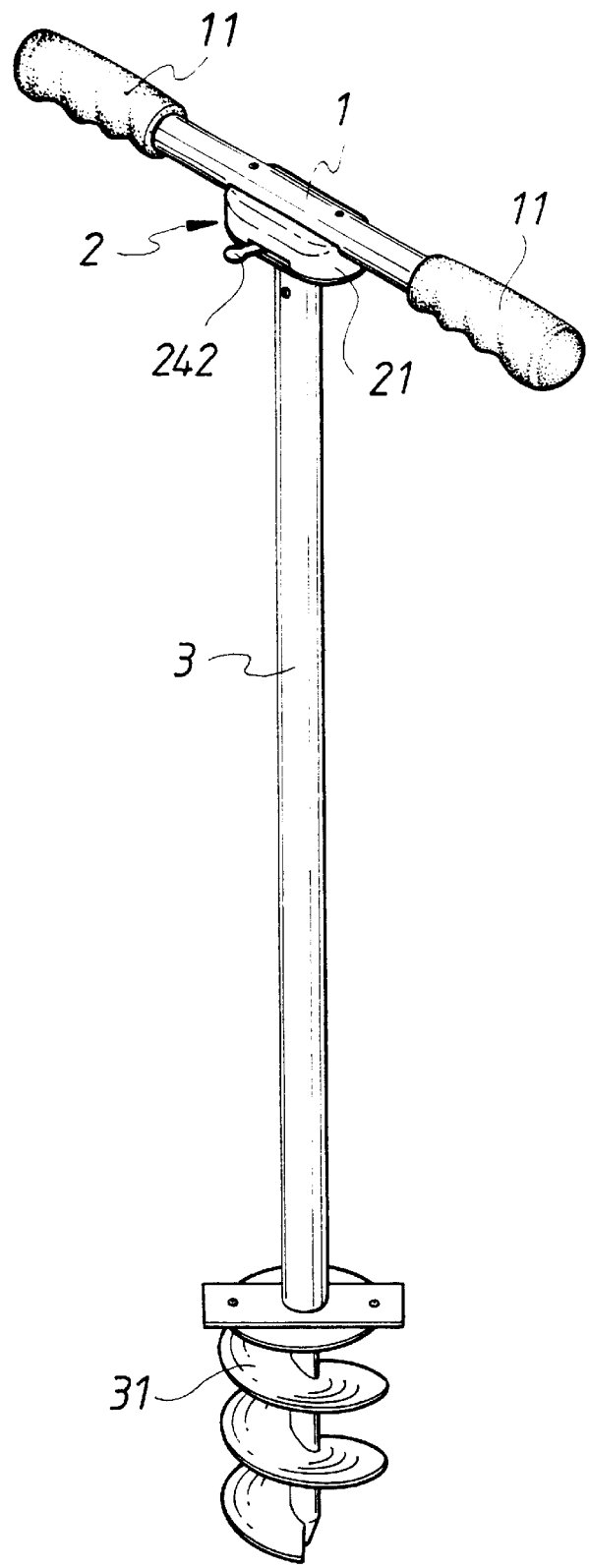
FIG. 7 is a perspective view of the assembly of the present invention.
Figure 8:
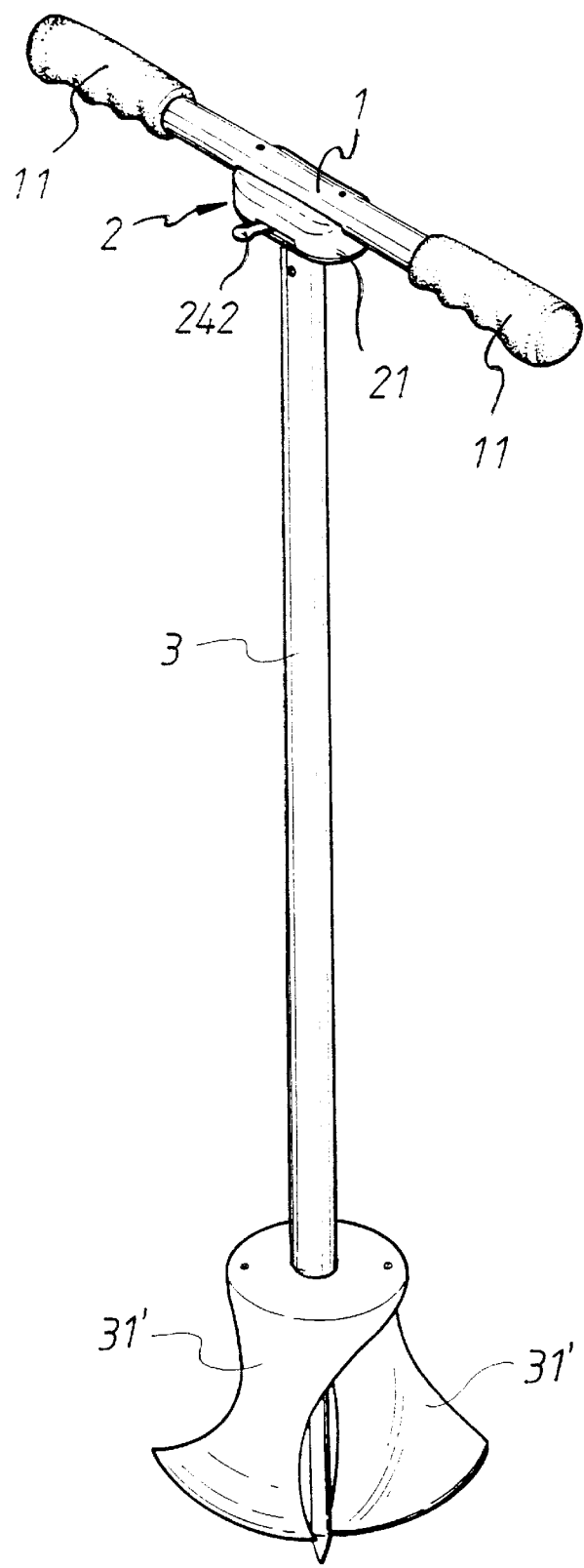
FIG. 8 is a preferred embodiment of a tooling head adapted to a tooling feeder of the present invention.
Figure 9:
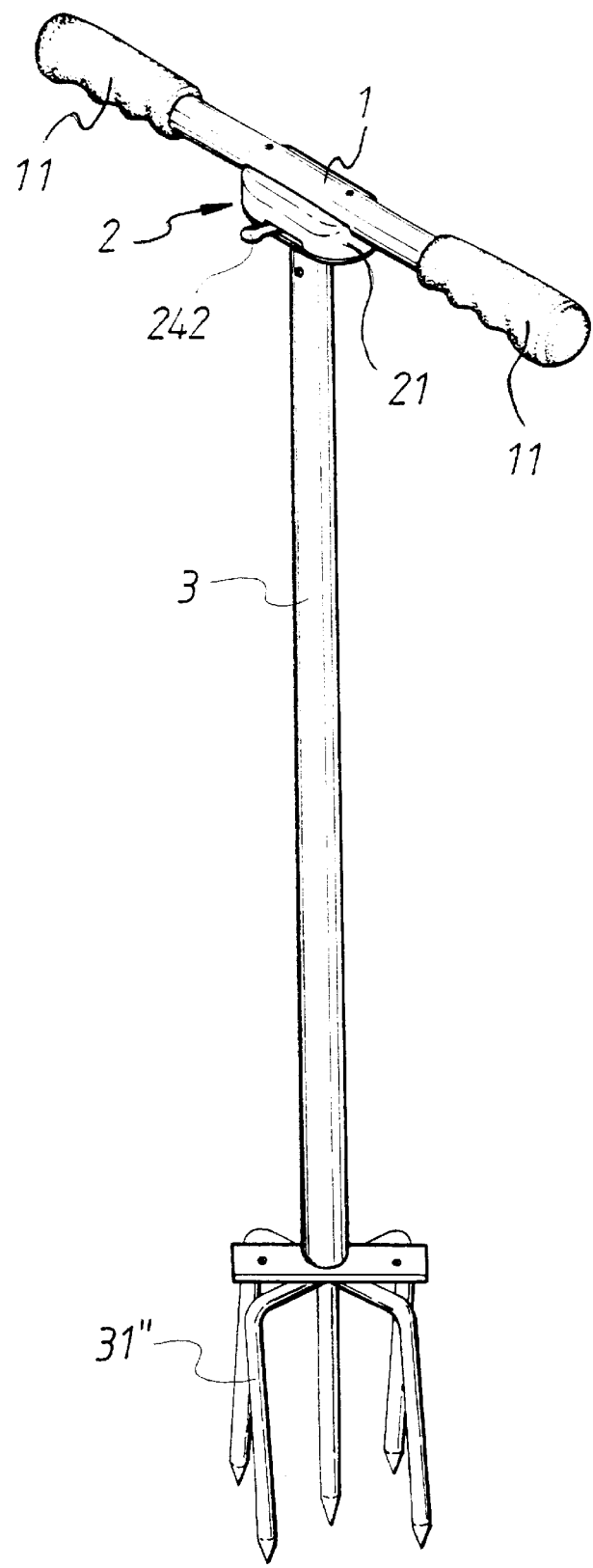
FIG. 9 is another preferred embodiment of a tooling head adapted to the tooling feeder of the present invention.

However, the tooling head 31 at the lower end of the tooling feeder 3 in not restricted to one particular form. As illustrated in FIGS. 4 and 7, said tooling head 31 may be in a form of auger to execute earth excavation; or as illustrated in FIG. 8, the tooling head 31' can be in the form of only two pieces of an auger to execute earth excavation by torsion; or as illustrated in FIG. 9, the tooling head 31" can be in the form a fork to execute earth scrap. Accordingly, it is to be noted that a preferred embodiment of the tooling head of the present invention is not limited and any summarized alteration for replacement within the art disclosed above shall be deemed as falling within the teaching of the present invention.

What is claimed is:

1. A garden earth auger, which comprises a handle, a drive mechanism, a tooling feeder, a tooling head secured at a bottom of the tooling feeder, a grip being respectively provided on both ends of the handle, a drive mechanism being fixed below a central section of the handle, a gear shaft vertically provided inside the drive mechanism and extending downward and connected to an upper end of the tooling feeder, and a circular yoke being inserted onto the gear shaft to control a pair of mobile pawls on either or both sides of the gear shaft when rotating the tool feeder by turning the handle to engage in or disengage from a ratchet to execute one-way drive of the gear shaft for the tooling head to continue digging earth in one direction.

2. The garden earth auger as claimed in claim 1 including a support with a hollow inverted U-shape, the support having a laterally extending trough on a top thereof for fixing the support below the handle, the trough including an axial hole penetrating a center of the trough for receiving a top of the gear shaft, and both bottom sides of the support being respectively provided with an insertion pin to receive the pawls.

3. The garden earth auger as claimed in claim 1, wherein the gear shaft includes a hollow rod having the ratchet provided at its upper end, a ring protrudes from a center of the top of the gear shaft, and a radial hole is provided in a lower end of the ring to vertically receive the gear shaft.

4. The garden earth auger as claimed in claim 1, wherein each of the pawls has a tip provided with on a top of one side of the pawl, a circular hole provided on another side of the pawl that receives a coil, and a pin hole provided at a rear end of the pawl; both pawls being placed inside the support and respectively held in place with a pin received in the pin hole of the pawl, and the coil biasing the tip of the pawl to engage the ratchet.

5. The garden earth auger as claimed in claim 1, wherein the yoke includes a circular ring having two tags extending vertically and downward from both sides thereof, a yoke lever extending downward from a front edge thereof, the yoke being inserted into an end of the ratchet with both of the tags extending along both sides of the ratchet, and the yoke lever extending out the support to turn the tags to control engagement or disengagement between the pawls and the ratchet.

\* \* \* \* \*